July 8, 1969 M. J. FLYNN 3,454,448
ROTARY VERTICAL LABELING MACHINE
Filed Oct. 24, 1965 Sheet 1 of 10

Michael J. Flynn
INVENTOR

BY Raymond N Matson
HIS PATENT AGENT

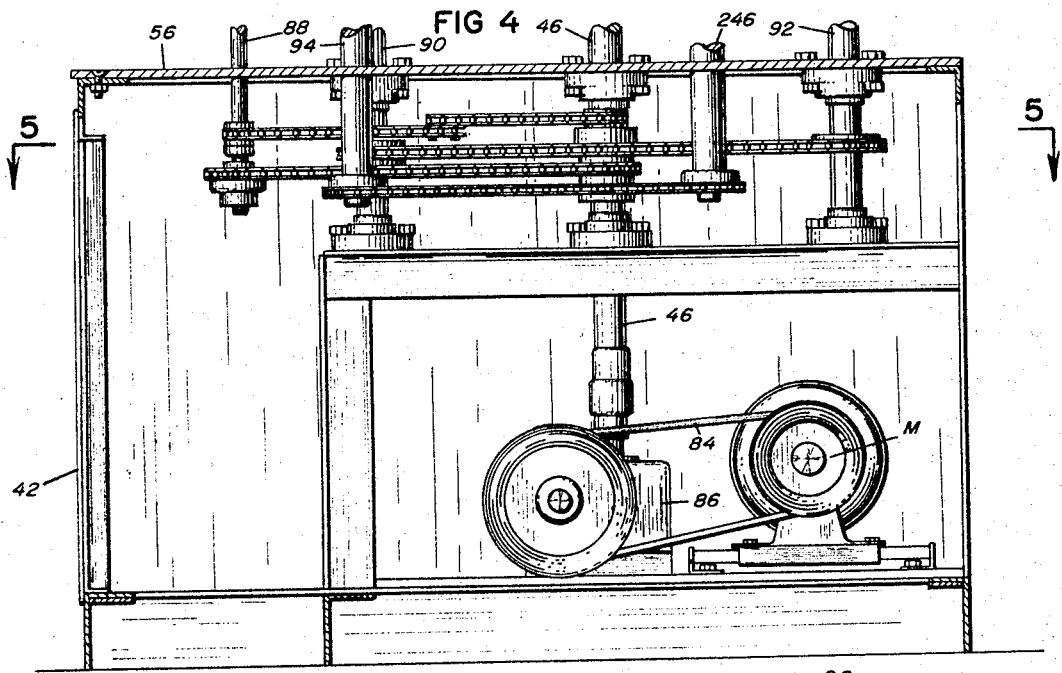
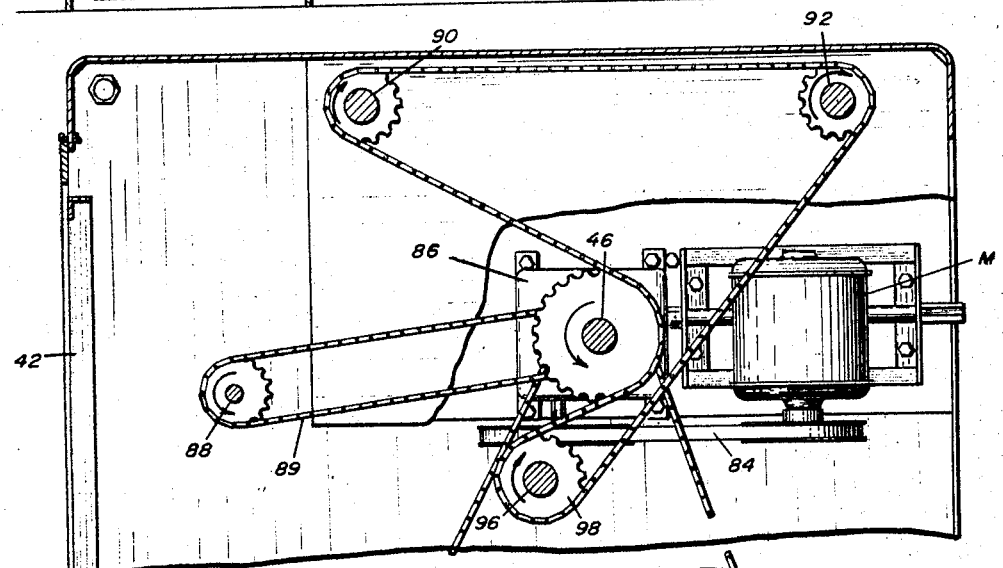
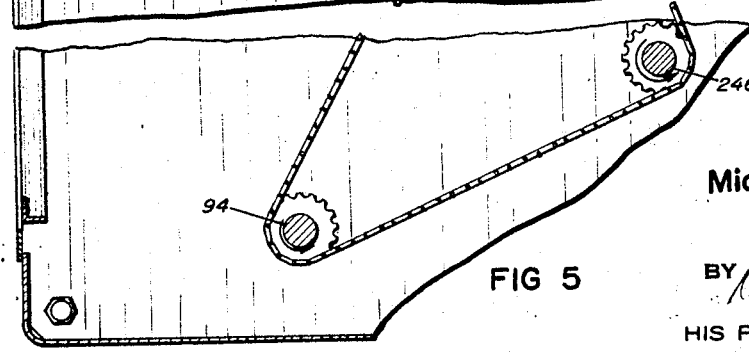
FIG 4
FIG 5
Michael J. Flynn
INVENTOR
HIS PATENT AGENT July 8, 1969    M. J. FLYNN    3,454,448
ROTARY VERTICAL LABELING MACHINE
Filed Oct. 24, 1965    Sheet 3 of 10
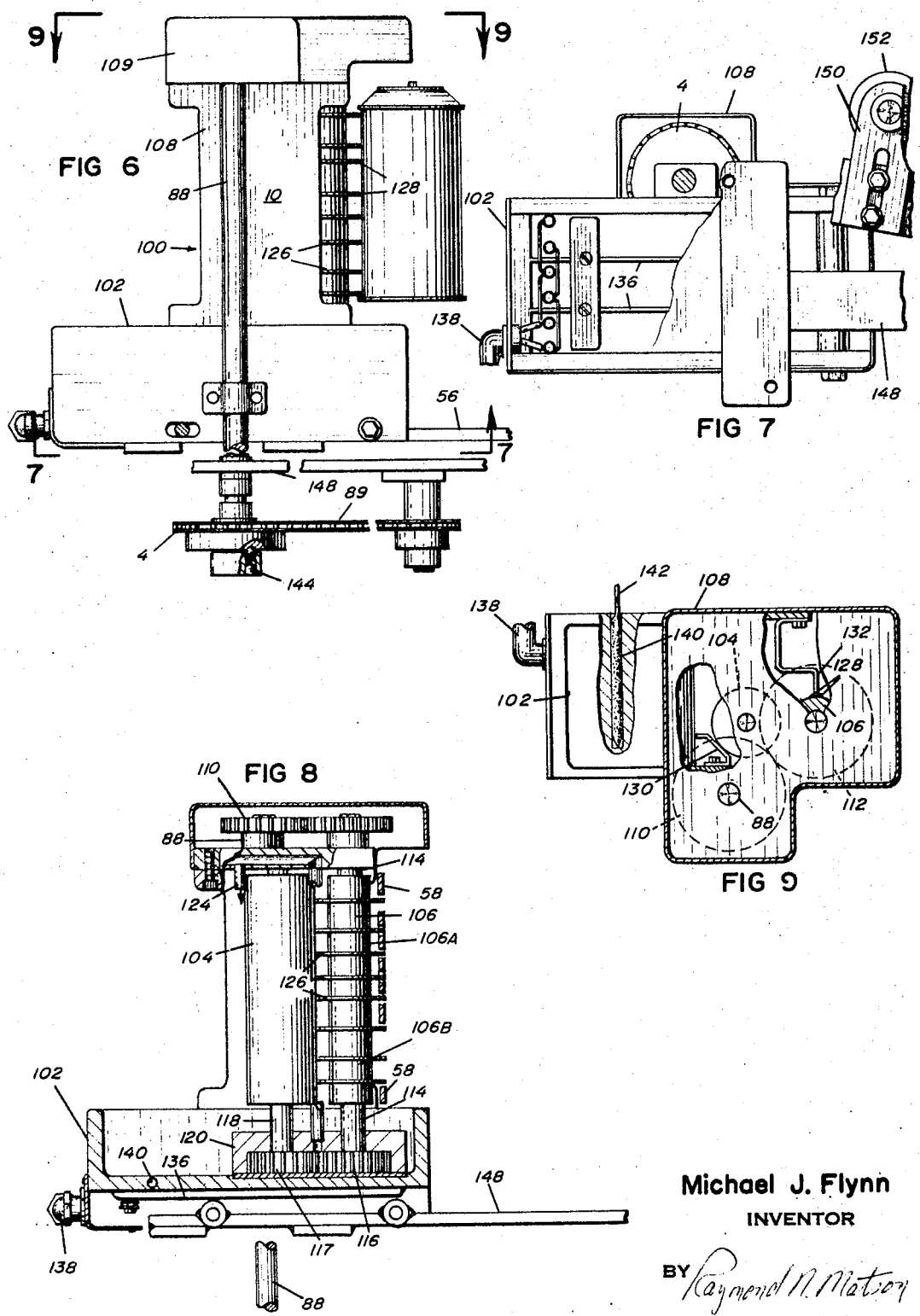
Michael J. Flynn
INVENTOR
BY Raymond N. Matson
HIS PATENT AGENT

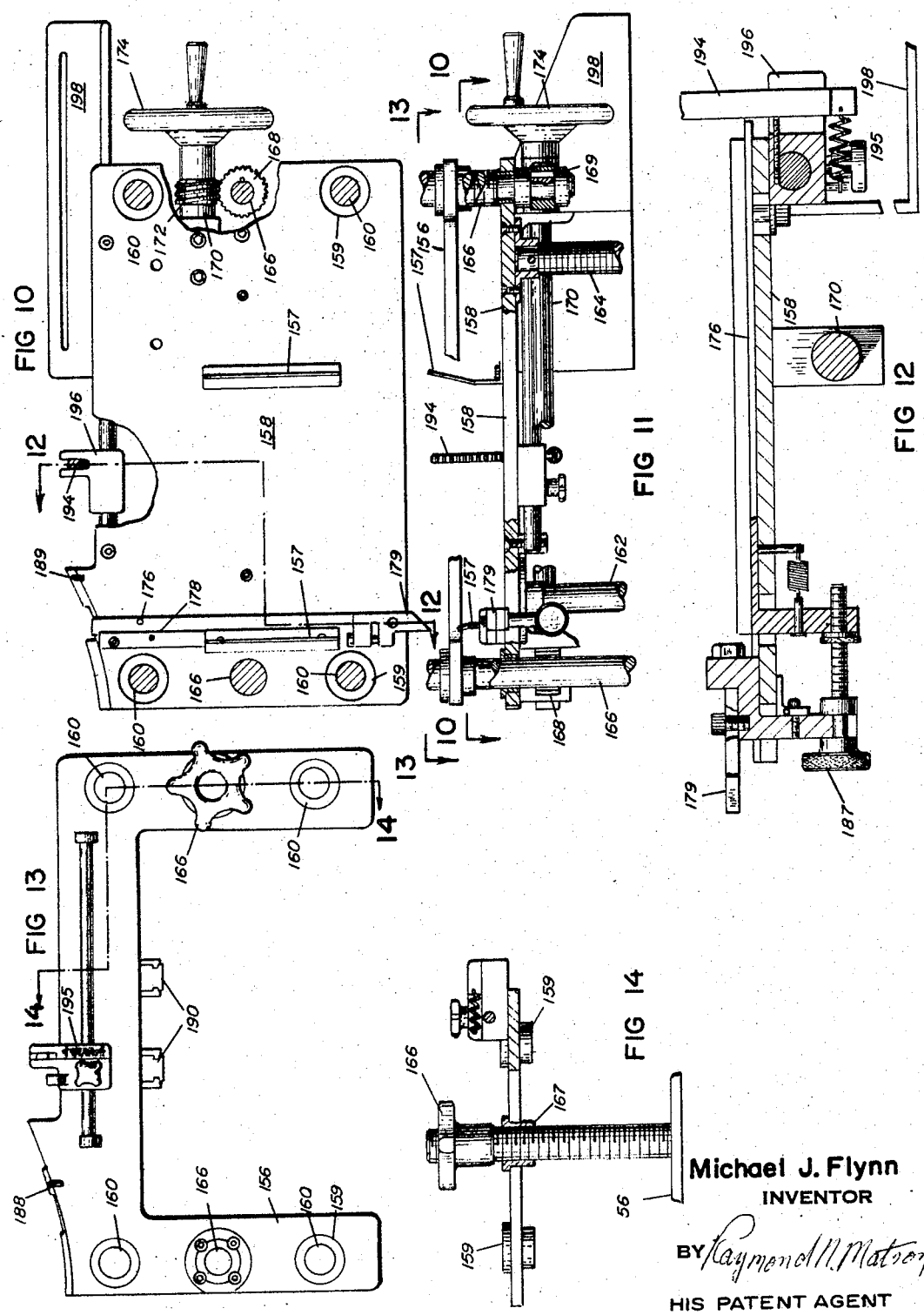

July 8, 1969  M. J. FLYNN  3,454,448
ROTARY VERTICAL LABELING MACHINE
Filed Oct. 24, 1965  Sheet 5 of 10

INVENTOR
Michael J. Flynn

BY *Raymond A. Matson*

HIS PATENT AGENT

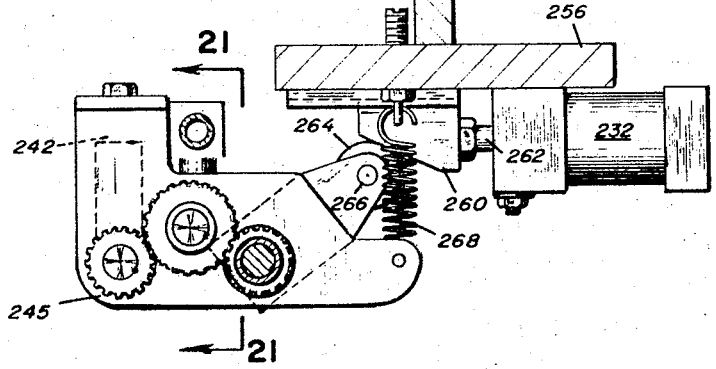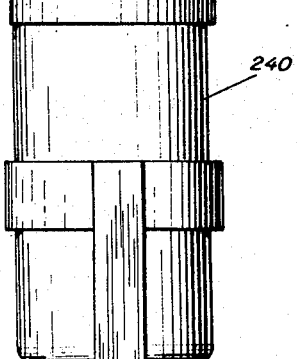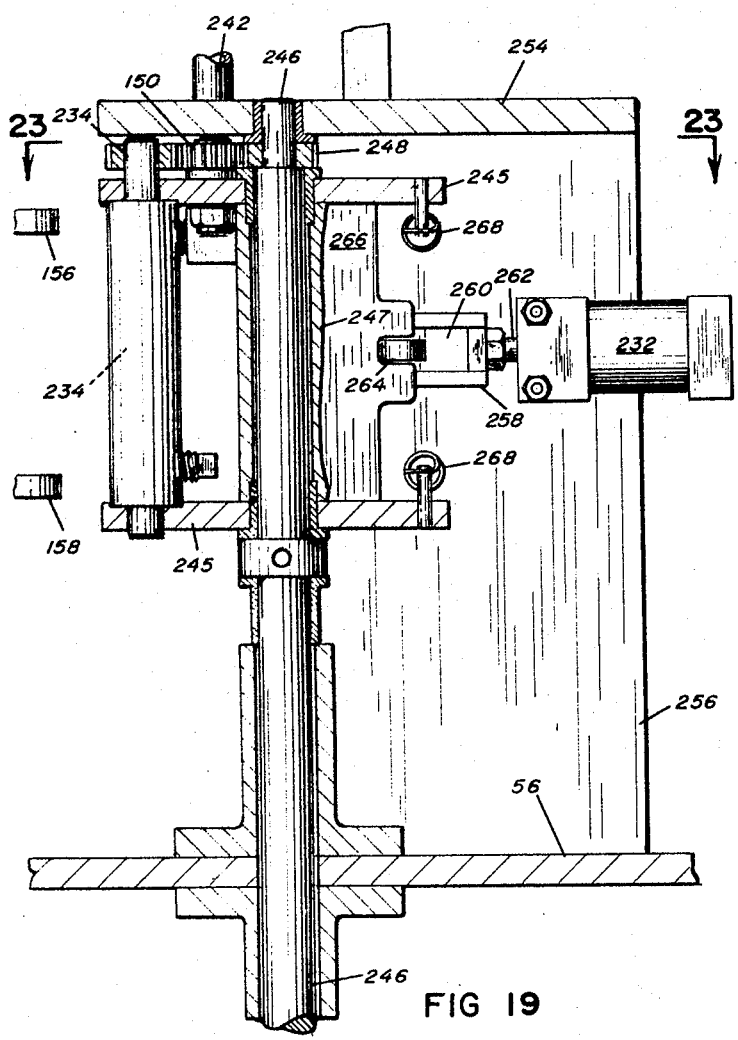

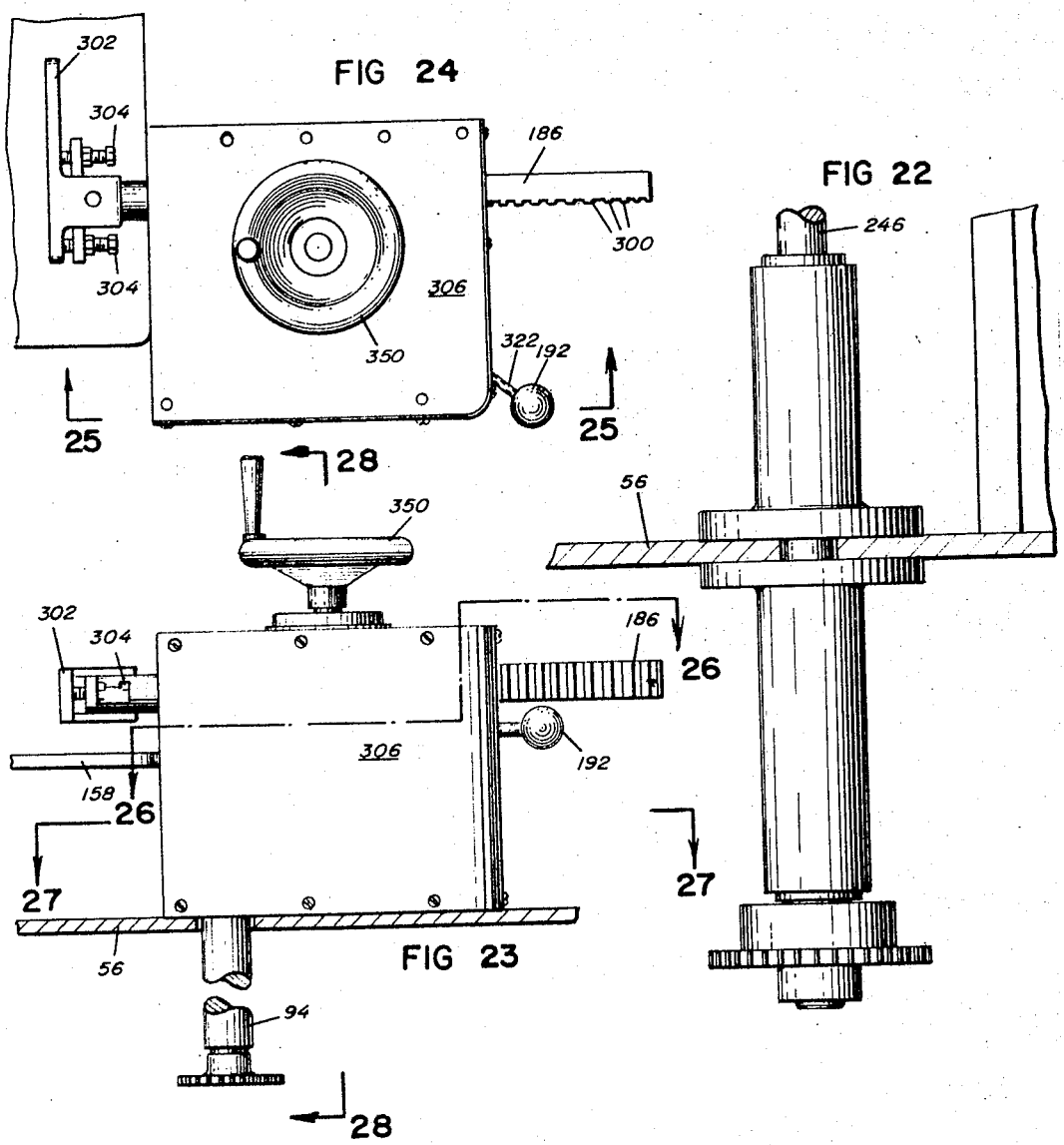

Michael J. Flynn
INVENTOR

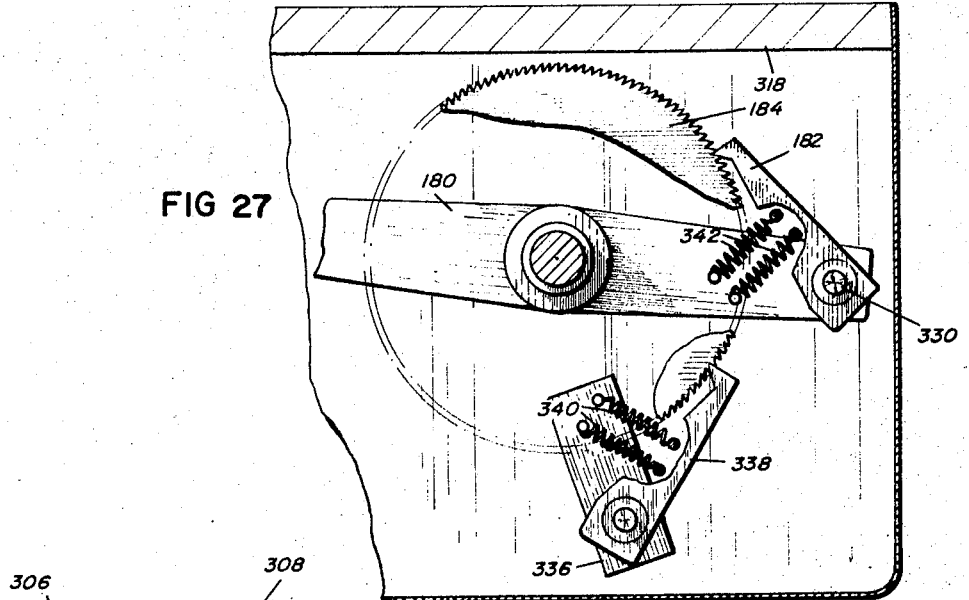
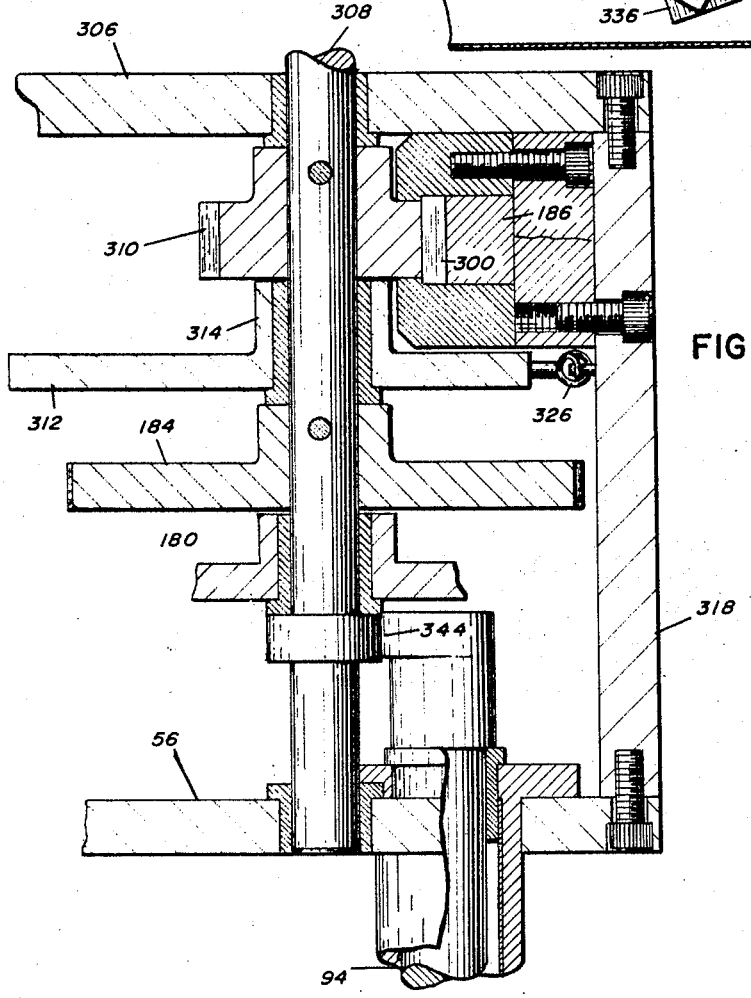

United States Patent Office 3,454,448
Patented July 8, 1969

3,454,448
ROTARY VERTICAL LABELING MACHINE
Michael J. Flynn, Hackensack, N.J., assignor to Kazmier Wysocki, Hackensack, N.J.
Filed Oct. 24, 1965, Ser. No. 504,385
Int. Cl. B65c 9/04, 9/20
U.S. Cl. 156—357                                    11 Claims

ABSTRACT OF THE DISCLOSURE

A machine for applying labels to rotating, vertically disposed containers of various heights and diameters by propelling them about an arcuate track while maintaining them vertical without engaging the label receiving surface area, past a spot gluing station, a label holding, guiding and feeding station including a label lap curling and pasting means, and a label smoothing station.

---

This invention relates generally to container labeling apparatus and more particularly to an improved machine for applying labels to vertically disposed metal, plastic, glass and other containers having a wide range of diameters and heights.

Apparatus of this general type has been known in the art for many years and despite continued development thereof and improvements therein, such apparatus insofar as is known, is still characterized by a number of objectionable features. Among these are: a poor design resulting in an inability to label flexible containers or filled containers without bursting them or having the top come off of a high percentage thereof; an impractical container feeding mechanism which results in the dislodging or twisting of the label on the container; an ineffective spot gluing mechanism which applies too much or too little glue on the container prior to its picking up a label; an ineffective label feeding magazine so that some containers are supplied with several superposed labels and others with none; and an operational speed so limited by poor and complex design as to render the apparatus impractical economically from a cost standpoint.

Accordingly, the main object of the present invention is to provide an improved, rotary, vertical labeling machine which will obvioate the above and other objectionable features characterizing known labeling machines.

An important object of the present invention is to provide an improved container labeling machine having a plurality of improved and novel cooperating means for feeding and guiding containers past a spot gluing station, a label holding, guiding and feeding station including a label lap and curling and pasting means, and label smoothing means—all cooperating to provide an extremely efficient and unusually high speed labeling machine.

A further important object of the present invention is to provide an improved container feeding and guiding means which is adjustable for different sizes of containers and which will: receive a succession of unspaced containers from a conveyor or turntable; automatically space and transfer them to a circular track to be propelled there about past one or more work stations; prevent their tilting; and return them to the conveyor in unspaced positions.

Another important object of the invention is to provide an improved and novel container spot gluing mechanism for use in a labeling machine etc. which includes means for controlling the amount of glue applied, the temperature of the glue, and includes a slip clutch to prevent damage to the glue roll drive in case operation is inadvertently attempted before the glue has melted.

A further important object of the present invention is to provide an improved label holding guiding and feeding mechanism for use with container labeling machines which is: actuable upon deletion of the label stack and exposure of a reach arm, by a container to feed labels to a predetermined height; adjustable to vary the vertical position and/or angle of a label to be applied to a container; and is provided with automatically operative stops to prevent labels from falling backwards so as to facilitate reloading of the holder or magazine.

A still further important object of the present invention is to provide an improved label lap end curling and pasting means for use with container labeling machines so as to effect a curling of the lap end towards rather than away from the container and to apply a layer of paste to the underside of the lap end by novel pasting means which is intermittently rotated by a container-engaged level or constantly rotated to prevent drying out of the paste, and which latter is moved into and out of engagement with the label as triggered by the photo cell or micro-switch by the arrival of a container.

Another important object of the present invention is to provide a rotary labelling machine for a wide variety of container types and sizes which have a pair of spaced, free wheeling guide rails or wheels which prevent tilting of the containers and a pair of high speed, container engaging propelling wheels which do not contact or displace the labels picked up by the containers as they are rotatably propelled in vertical position through the machine along an arcuate track.

Other objects and advantages of the invention will become apparent during the course of the following description:

In the drawings there are shown two embodiments of the invention. In these showings:

FIGURE 4 is an elevational view showing the driving means of the invention;

FIGURE 5 is a plan view thereof taken on the line 5—5 of FIGURE 4;

FIGURE 6 is an elevational view of the glue spotting mechanism;

FIGURE 7 is a bottom plan view thereof taken on the line 7—7 of FIGURE 6;

FIGURE 8 is a vertical sectional view of the glue spotting mechanism;

FIGURE 9 is a top plan view thereof taken on the line 9—9 of FIGURE 6;

FIGURE 10 is a top plan view of the label holding and guide assembly taken on the line 10—10 of FIGURE 11;

FIGURE 11 is a fragmentary elevational view thereof;

FIGURE 12 is a vertical sectional view thereof taken on the line 12—12 of FIGURE 10;

FIGURE 13 is a plan view thereof taken on the line 13—13 of FIGURE 11;

FIGURE 14 is a fragmentary vertical sectional view thereof taken on the line 14—14 of FIGURE 13;

FIGURE 19 is a vertical sectional view of a modified form of the label lap end paste applicator assembly;

FIGURE 20 is a horizontal sectional view thereof taken on the line 20—20 of FIGURE 19;

FIGURE 21 is an elevational view thereof taken on the line 21—21 of FIGURE 20;

FIGURE 22 is an elevational view of the lower portion of the continuously rotating drive shaft of the paste applicator roll;

FIGURE 23 is a side elevational view of the label feed mechanism;

FIGURE 24 is a top plan view thereof;

FIGURE 27 is a similar view taken on the line 27—27 of FIGURE 23; and

FIGURE 28 is a vertical sectional view thereof taken on the line 28—28 of FIGURE 23.

Figure 1:
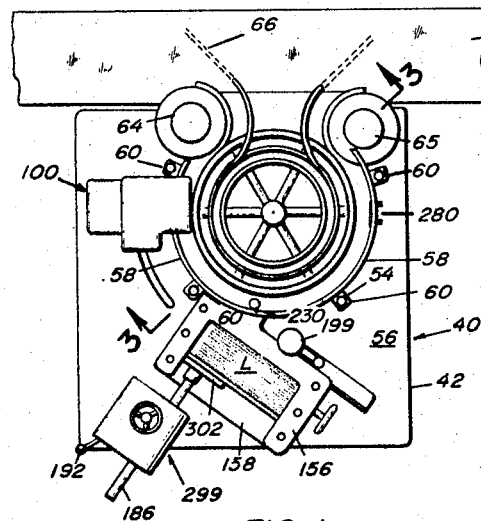
FIGURE 1 is a top plan view of the machine comprising the present invention.
Figure 2:
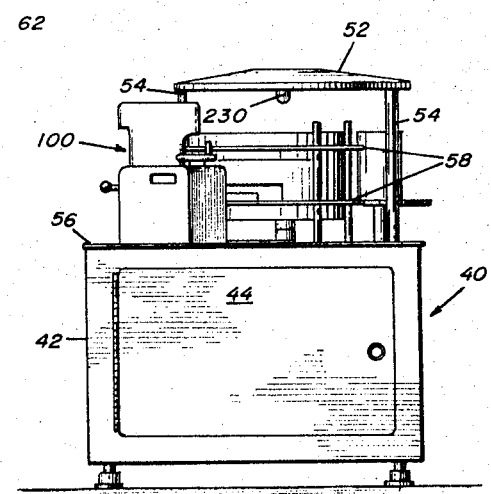
FIGURE 2 is a front elevational view thereof.
Figure 3:
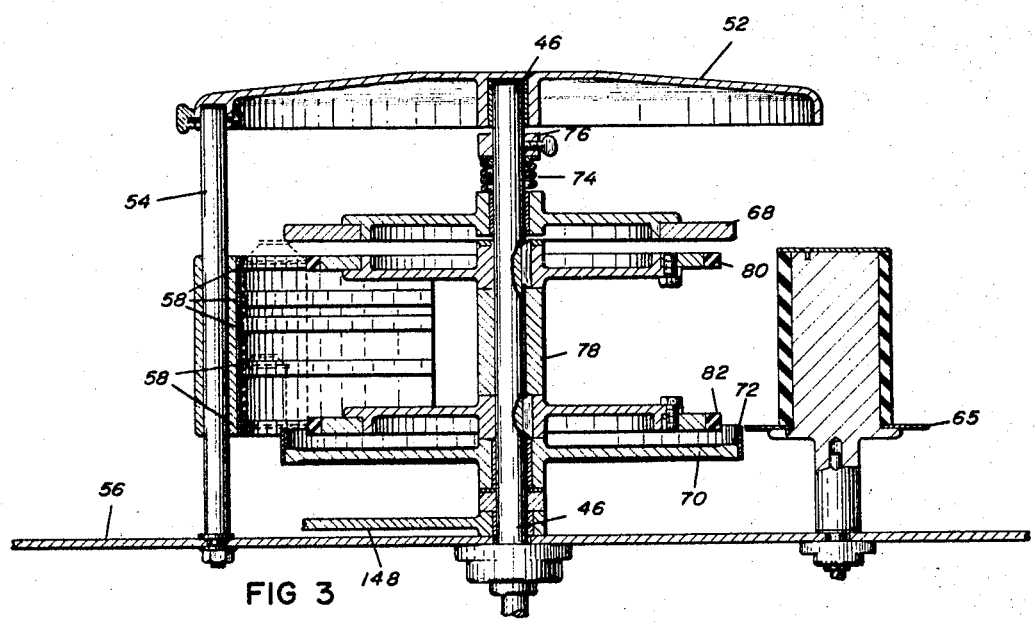
FIGURE 3 is a fragmentary vertical sectional view thereof to an enlarged scale taken on the line 3—3 of FIGURE 1.

The labeling machine comprising the present invention provides an arcuate, vertically disposed track along which spaced cylindrical containers are rotatably propelled at the rate of about 300 per minute by a pair of propelling wheels which are so spaced as not to engage a label or the area on a container which it will occupy, the containers being prevented from tilting by a pair of spaced, supporting and confining, free wheeling guide wheels.

The containers enter the arcuate track from a conveyor by means of an overlapping rotary spacing wheel, or disc and are rotated past a hot, spot gluing roll which applies small spots of glue to the body of the containers. As each of the containers rotate past a label holding, guiding and feeding magazine, they pick up a label by the adhesion of the glue spots and actuate a paste applicator which applies paste to the lap end of the label. The containers are rolled on through the machine each wrapping a label around their body, drawing the label from under a curling bar, and then roll past a sponge rubber seaming pad which draws the label tight and firmly affixes the lap seam, and then are discharged back onto the conveyor.

Container feeding and guiding means

Referring to FIGURES 1 to 5 of the drawings, numeral 40 designates the labeling machine as a whole which includes a supporting cabinet 42 having a door 44 which affords access to the power and various driving means mounted on and enclosed therein. A main driving shaft 46 is journalled in and projects upwardly from the cabinet top 56 and is covered by a circular cover 52 which is supported by a plurality of posts 54 mounted on the rigid top 56 of the cabinet 42.

An arcuate, vertically disposed container track 58 formed of two or more vertically spaced, horizontally extending arcuate bands is adjustably mounted for different container sizes concentrically with the drive shaft 46 on the cabinet top 56 by means of a plurality of clamp brackets 60 which are slidable on the posts 54. Preferably the bands of the track 58 are so spaced as to engage the top and bottom perimeters of the containers as indicated in dotted lines for two different sizes thereof in FIGURE 3 leaving the intermediate area free for the application of the glue spots, the label, and the smoothing action of the seaming pad. The clamp brackets are also radially adjustable with respect to the posts 54 so that the track will accommodate different container diameters.

Containers to be labeled whether spaced or unspaced, are shunted from a turntable or a conveyor 62 of given linear speed onto an overlapping turntable or spacing disc 64 by a deflecting guide 66. The disc 64 has a higher peripheral speed than the conveyor and so automatically spaces the containers for their travel (FIGURE 1) through the labeling machine 40 during which they are supported and prevented from tilting by spaced upper and lower guide wheels 68 and 70 (FIGURE 3), the latter having a container-supporting peripheral flange 72, and both having a free wheeling mounting on the main drive shaft 46. A slight force fit or pressure is effected on the containers by the upper guide wheel 68 by means of a compression spring 74 acting between the latter and an adjustably mounted shaft collar 76.

It is to be noted that the spacing of the free wheeling container guide wheels 68 and 70 (and of the propelling wheels to be described) may be reduced from that shown (FIGURE 3) to accommodate a tall container, to accommodate a short container by simply removing the supporting and spacing collar 78 from between the upper and lower guide and propelling wheels. Lowering of the upper arcuate bands of the track 58 would also be effected.

The containers to be labeled are rotatably propelled clockwise about their axes and counterclockwise about the track 58 by a pair of rubber tipped propelling wheels 80 and 82 which are spaced respectively with or without the main shaft collar 78 a distance slightly greater than the height of the label to be placed on the tall or short containers. This is an important feature of the invention in that this arrangement prevents the displacement or twisting from their true positions, of the labels picked up by the spot glue carrying, rotating containers.

Power and driving apparatus

As shown in detail in FIGURES 4 and 5, the cabinet 42 encloses and supports power means in the form of an electric motor M of suitable horsepower, ⅓ horsepower having been found to be adequate. Power is transmitted through sheaves or sprockets by a belt drive or chain drive 84 to the main drive shaft 46 through a speed reducer 86. The main drive shaft 46 is provided with a plurality of sheaves or sprockets by which power is simultaneously transmitted by belts or chains to the spot gluing apparatus drive shaft 88, the shafts 90 and 92 of the infeed and discharge spacing discs 64 and 65, the drive shaft 94 for the label feed cam, and a stub shaft 96 for the idler sprocket 98 of the spacing discs 64 and 65.

Spot gluing mechanism

As seen in FIGURES 6, 7, 8 and 9, the spot gluing mechanism is designated as a whole by numeral 100 and comprises a glue pot 102, a vertically disposed glue carrier roll 104, and a glue transfer roll 106 contained in a housing 108 having a gear cover 109 for a spur gear 110 fixed on the upper end of the spot gluing mechanism drive shaft 88, and for its meshing spur gear 112 which drives the shaft 114 of the transfer roll 106. The transfer roll shaft is provided at its lower end with a gear 116 which meshes with a gear 117 fixed to the lower end of the glue carrier roll shaft 118, the two gears comprising a hot melted glue pump arranged in a gear pump housing 120 having communication with the glue pot 102.

A discharge tube (FIGURE 8) conducts pumped glue from the pump housing 120 upwardly to a point 124 where the melted glue is permitted to flow down the surface of the glue carrier roll 104. The glue is transferred to a container by means of the transfer roller 106 which is formed of upper and lower segments 106A and 106B each having vertically spaced discs 126 fixed thereto. The periphery of the discs is provided with circumferentially spaced projections 128 which engage the surface of the glue carrier roll 104 to pick up the glue and extend between the track bands 58 into engagement with the wall of a container to place the glue spots thereon.

The best spot gluing results are obtained when the smallest amount of glue is applied by the spots to the container. Therefore to regulate the amount applied, the glue carrier roll 104 and the glue transfer roll 106 are each provided with scrapers 130, 132 respectively (FIGURE 9) mounted by screws 134 adjustably movable in slots so that the scrapers may be moved toward and away from the rolls to adjust the amount of glue carried thereby.

The base of the glue pot 102 is provided with an electric strip type heater 136 receiving energy by connections extending through a conduit 138 to an energy source including automatic temperature controls (not shown) and with a thermocouple 140 which is also connected electrically by leads 142 with such controls. Once the desired glue temperature is set, the glue is ready for use after about one hour's warm-up time.

In the event that an attempt is made to operate the labeling apparatus before the glue is melted, the spot gluing mechanism drive shaft 88, which is driven by the belt or chain 89 from the main drive shaft 46, includes a ball detent clutch 144 which protects the glue roll drive by slipping out of engagement when overloaded. The clutch is reset by merely turning the sprocket of the drive shaft chain 89 until the balls snap back into their seats.

It will be appreciated that adjustment of the circular path traveled by the containers to be labeled as to width and/or height to accommodate a different sized container involves adjustment of the position or vertical extent of the glue transfer roll and its supporting assembly. The adjustment for height is readily accomplished for a smaller container by loosening the track supporting clamps 60 so that the track may be moved out of the way and then sliding the upper glue transfer roll segment 106A upwardly above the container's height so as to be out of the way.

The track and position of the glue transfer roll assembly 100 must be then adjusted to accommodate the change in diameter of the container upon which the track is again secured by the repositioning and tightening of the clamps 60. The change in position of the glue transfer roll is enabled by the mounting of the glue pot and roller assembly 100 upon the adjustable arm 148 so as to vary the distance or radius of the assembly from the main driving shaft 46. This adjustment is enabled by the concurrent adjustment of the chain or drive belt slack by the slack take up bracket 150 and idler 152.

Label holding and guiding magazine and curling bar

The improved and novel label holding and guiding magazine and station with its label lap end curling bar is disclosed in FIGURES 10, 11, 12, 13, 14 and 15 of the drawings and includes an upper label guide plate 156 and a lower label guide plate 158 having laterally spaced, upstanding label retainers 159 both of which plates are slidably mounted by spacers 159 adjacent their corners for sliding vertical adjustment on posts 160 fixed to the cabinet top 56. The height of the lower label guide plate is adjusted with respect to the top 56 with which it is normally parallel by means of pairs of adjusting screws 162, 164. It is some times necessary that the lower (and label supporting) plate be angularly adjusted in order to achieve accurate alignment of the labels applied to the container. This is effected by adjusting either pair of the screws 162, 164 independently of the other pair as required.

The upper label guide plate is supported by and adjusted with respect to the lower plate to accommodate various sizes of labels by means of a pair of screws 166 having threaded engagement by elevating nuts 167 with the upper plate 156 and terminating at their lower ends in helical gears 168 keyed thereto and supported by collars 169. A gear shaft 170 extends between the screws 166 and is provided adjacent its ends with helical threaded portions 172 meshing with the helical gears 168 so that upon rotation of a hand wheel 174, relative vertical movement of the upper and lower label guide plates 156, 158 is effected.

Figure 26:
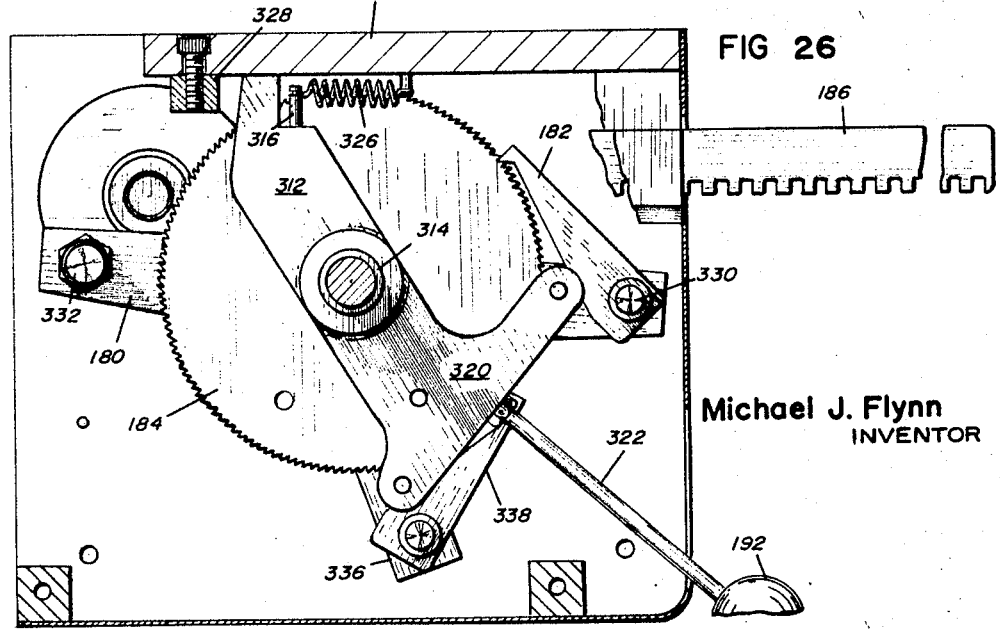
FIGURE 26 is a horizontal sectional view thereof taken on the line 26—26 of FIGURE 23.

Mounted on the lower label guide plate 158 is a reach arm 176 which is slidable along a retainer 178 and terminates at its outer (radially) end in an inclined cam 179. When the magazine formed by the upper and lower label plates 156, 158 is fully loaded, the labels L (FIGURE 1) extend beyond the reach arm 176. As the labels are depleted, the reach arm is gradually exposed thus allowing a container to come in contact with it. When this occurs, the rocker arm 180 (FIGURE 26) located in the label feed housing to be described engages the pawls 182 into the teeth of the ratchet wheel 184. As the ratchet wheel is indexed, the label feed arm 186 (FIGURES 1, 23–28) moves forward feeding labels L to a predetermined stacked height (or as seen in FIGURE 1) feeding labels radially inwardly to a predetermined depth. This stacked height or depth of the label stack may be adjusted by means of the knurled thumb screw 187 located at the rear of the reach arm 176 (FIGURE 12).

A pair of knives 188, 189 are respectively fixedly mounted on the upper and lower guide plates 156, 158 (FIGURES 10 and 13) and these cut through the labels as they fed into the machine and function to hold the stack of labels L in a firm and secure position in the magazine and prevent it from scuffing at the label pick-up point. As the label feed arm 186 moves in and the label stack is depleted, a pair of label stops 190 (FIGURE 13) located on the upper label guide plate 156 drop down to thus indicate that the label magazine should be reloaded. Moreover, the label stops 190 prevent the edge stacked labels from falling backwards to thus allow the necessary seconds of time to retract the label feed arm 186 (as will be described) and to reload the magazine without shutting the labeling machine 40 off. As the additional labels are moved forwardly, the stops 190 are automatically raised.

The magazine is readily reloaded by pushing a label feed release lever (FIGURES 1, 23–25) 192 to the right or counterclockwise to disengage pawls 182 and 336 which allows the spring arbor return spring to automatically retract the label feed arm 186. A new stack of labels is positioned on the lower guide plate 158 in the magazine with the printed side of the labels toward the operator, and the label feed arm 186 is then cranked to its forward position. The labels thus loaded must, of course, be of the same width and height and their edges even at the sides.

A curling bar on iron 194 (FIGURES 10–13 inclusive) is mounted by adjustable tension springs 195 between guides 196 positioned on the upper and lower label guide plates 156, 158 so as to be held against the lap end of the labels L of the stack. The function of the curling bar which extends vertically across the width of the labels, is to form the label ends to the contour of the container to thus prevent the lap end of the label from curling away from the container. Heavy, stiff, and varnished labels usually require more spring tension on the curling bar 194 than light soft labels as both require as much curl as can be given them up to the point where they would begin to curl under. When the curling bar becomes clogged or gummed up with paste, it is readily removed for cleaning by merely lifting it out from the retaining springs 195.

Label lap end paste application

Figure 18:
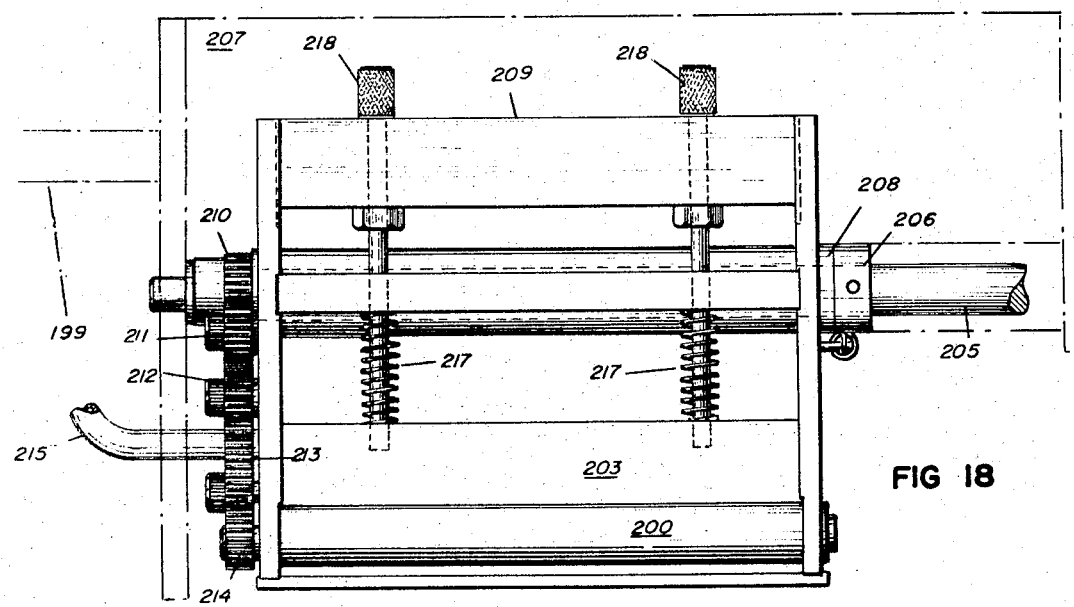
FIGURE 18 is a vertical elevational view thereof.
Figure 15:
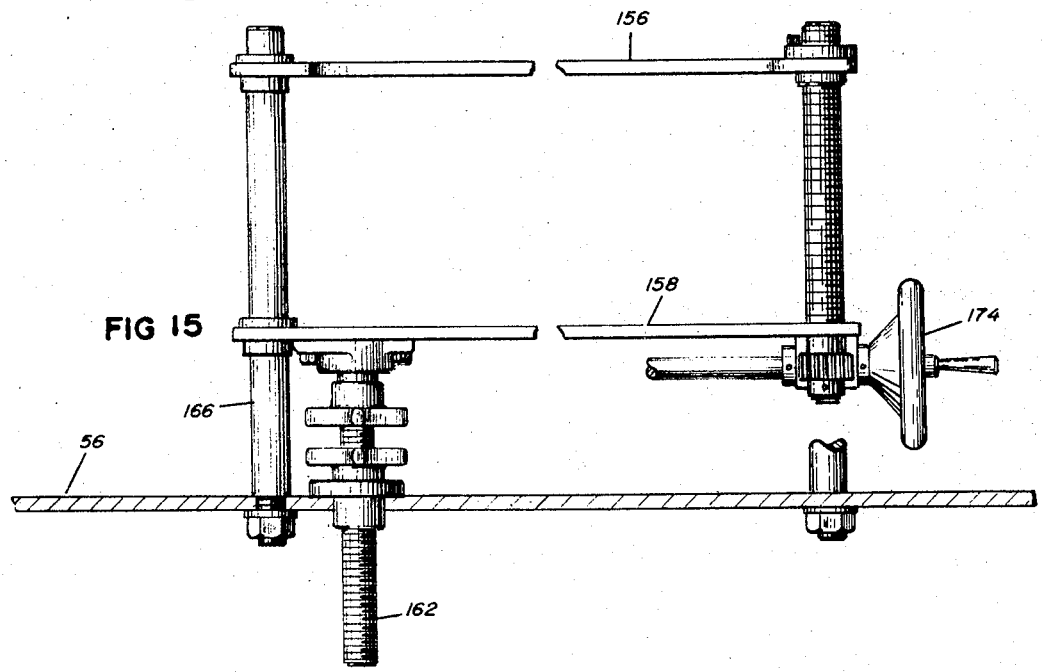
FIGURE 15 is a rear elevational view thereof.
Figure 17:
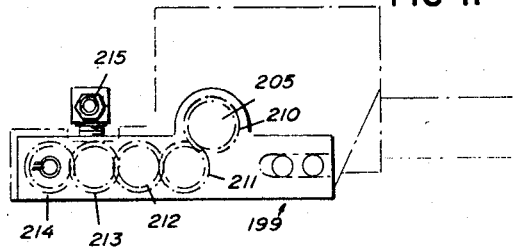
FIGURE 17 is a top plan view of the paste applicator assembly.
Figure 16:
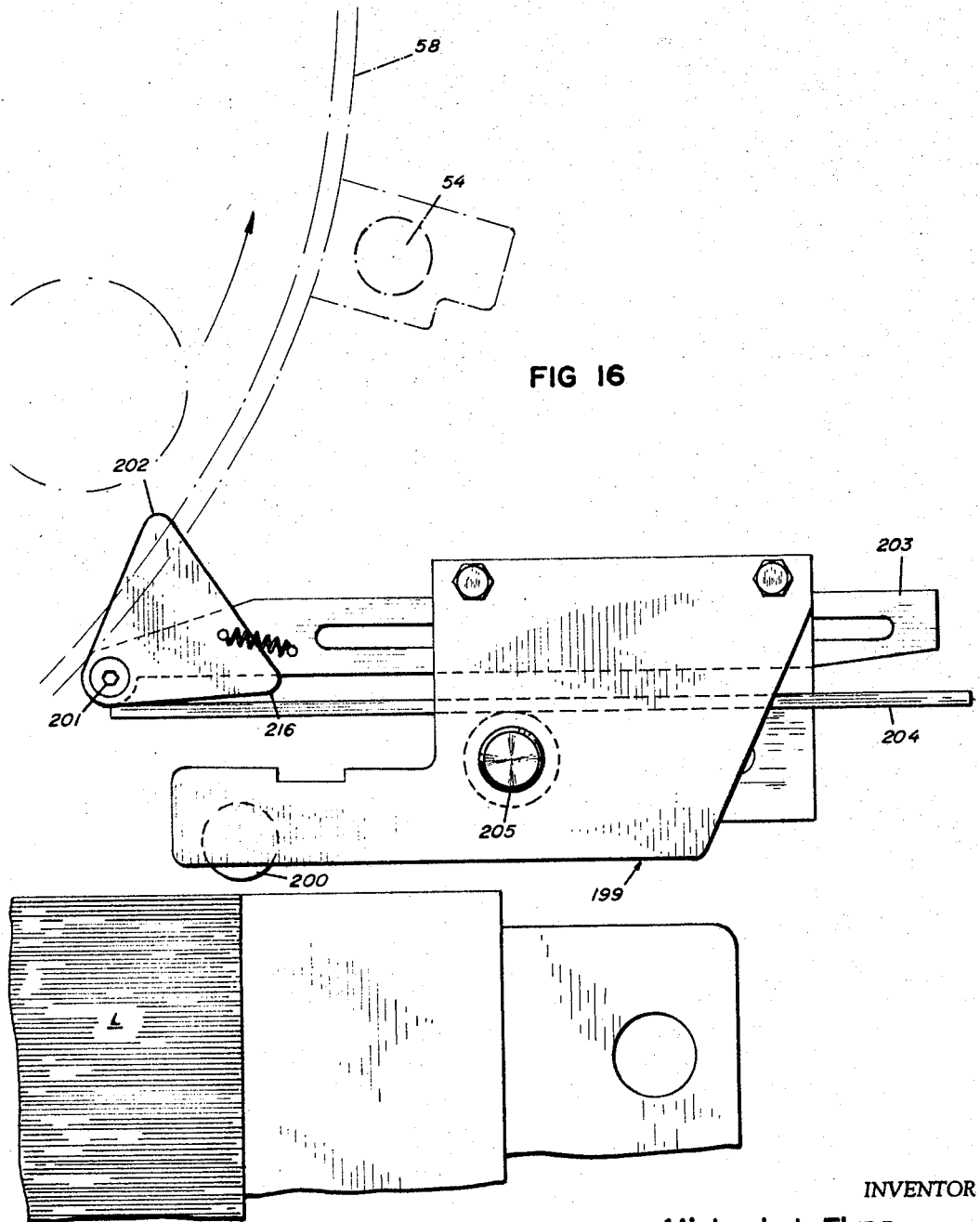
FIGURE 16 is a top plan view of a container actuated, label end paste applicator mounting bracket and the actuating pawl.
Figure 25:
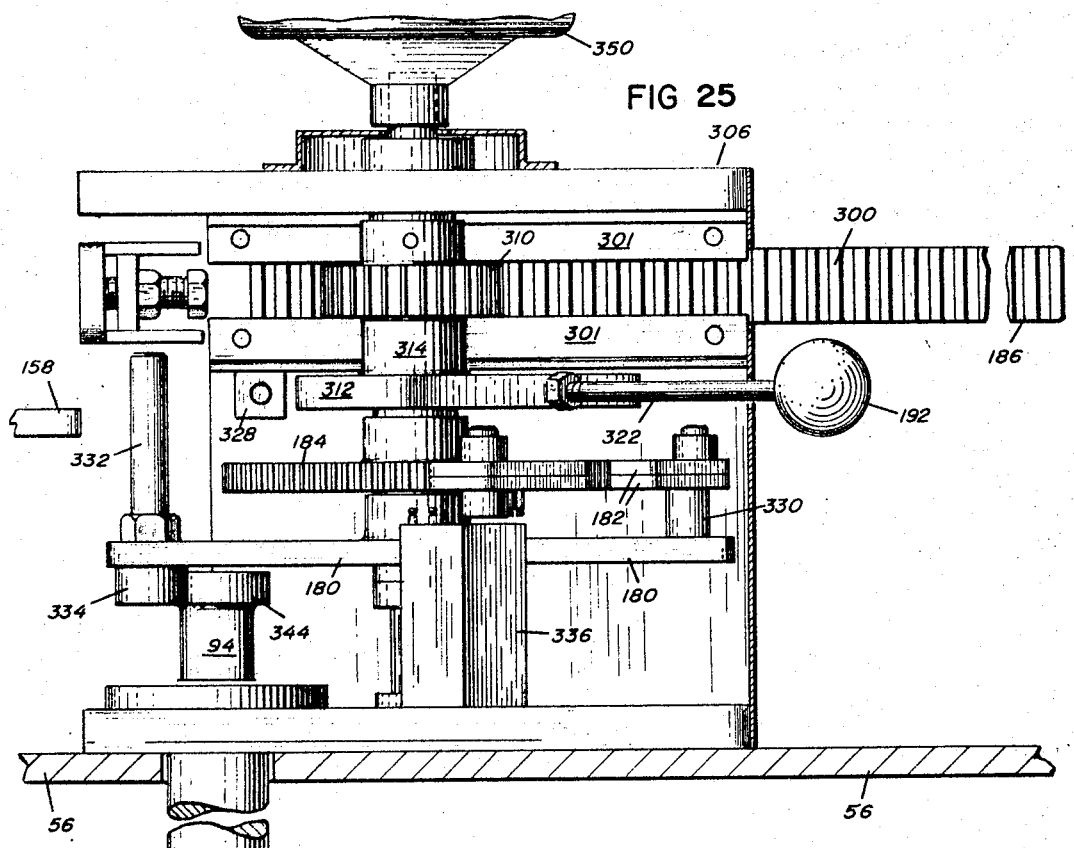
FIGURE 25 is a vertical sectional view thereof taken on the line 25—25 of FIGURE 24.

FIGURE 16–18 inclusive illustrate the embodiment of the paste applicator for the label lap end which is preferred for use with the more rigid containers to be labeled in that it is intermittently operated to feed fresh paste to the lap end of the labels by the successive engagement of each of the containers with a triangular actuator pawl 202 pivotally mounted as a 201 on a slotted actuator support arm 203 which is mounted on the paste applicator assembly 199.

The paste applicator assembly 199 is adjustably and pivotally mounted on the cabinet top 56 by an L-shaped bracket rotatably mounted on the drive shaft 205 which supports on a collar 206, upper and lower paste reservoir holder and assembly mounting plates 207 and 208 of a paste roll housing 203 which are spaced by a pivotal spacer tube 209. Thus, the paste roll reservoir and housing 203' is pivotal about the drive shaft 205 which drives meshing gears 210, 214 which rotate the paste roll 200 and the paste feed roll in contact therewith to which paste is delivered by a tube 215. Roll 200 rotates continuously maintaining a fresh uniform film of paste, being driven by shaft 205 which is coupled to the main drive of the machine.

The paste applicator assembly 199 is biased by spring means (not shown) so as to hold paste applicator roll 200 in the position shown in FIGURE 16 where it is adjacent the lap end of the stack of labels L. The engagement of each successive container as it is picking up a label, with the triangular actuator pawl 202, pivots it so that the other free end 216 of the actuator pawl engages the actuating lever 204 to pivot the assembly 199 about the drive shaft 205 so that the paste roll contacts and applies paste to the butt end of the top label of the stack L. The position of the paste roll 202 in the housing 203′ is resiliently maintained by springs 217 mounted on knurled head adjusting screws 218. The entire assembly pivots about shaft 205 intermittently, each time pawl 202 which is pivoted on the stationary support arm 203 (which is slotted to permit adjustment for different sizes of containers), is actuated by a container, applying paste to the label intended for the actuating container. When there is no container, the assembly remains in a dormant position with roll 200 still rotating.

Modified paste applicator assembly

FIGURES 19 to 21 inclusive disclose a paste applicator for the lap end of labels which is particularly suited for use with flexible containers which are inherently unable to mechanically actuate the paste feed mechanism or which for other reasons are unsuited for such mechanical engagements. In this embodiment, such actuation is effected by the container to be labeled rolling against a micro-switch (not shown) or by breaking the vertical beam of a photo electric cell 230 (FIGURES 1 and 2) which by conventional electrical circuits controls a solenoid air valve and cylinder 232 connected to a suitable source of air pressure.

As shown in the drawings, the paste roll 234 is continuously rotated by a gear 236 and paste is furnished to the surface thereof by a manifold 238 which is furnished with fresh paste by gravity from a reservoir 240 and conduits 242, 244. The paste roll and manifold are supported on a carriage 245 comprised of a pair of spaced plates rigidly connecting to a spacing sleeve 247 which is pivotally mounted on a bearing mounted on a main drive shaft 246 which is driven by belts or chains and sprockets or sheaves by the speed reducer 86 and motor M (FIGURES 4 and 5). Continuous rotation of the paste roll 234 is effected through its gear 236, by a drive pinion 248 fixed to the drive shaft 246 acting through the meshing gear 250.

The upper end of the drive shaft 246 is journalled in the top portion 254 of an angled vertically disposed plate 256 mounted on the labeler cabinet top 56 rather than on the lower label guide plate 158 as before. The plate 256 supports the air cylinder 232 and is provided with a channelled cam guide and slide plate 258 for an angled cam 260 fixed to the left end of the piston rod 262 of the cylinder 232.

A cam followed roller 264 is mounted on a pair of supporting members 266 which are rigidly fixed to the spacing and carriage supporting sleeve 247, and engages the inclined surface of the wedge cam 260 under the action of a pair of vertically spaced springs 268. When each container is picking up its label, it moves across and brakes the vertical beam of the photo electric cell 230 and the control circuit which embodies suitable safety controls (not shown) activates the solenoid air valve and cylinder 232 to move the cam 260 to the left (FIGURES 19 and 20). The applicator surface of the pivoted carriage supported paste roll 234 which is normally spaced ⅜″ from the lap end of the label, is now swung against the label by the engagement of the cam 260 with the cam follow sleeve mounted roller 264 to apply paste to the lap end.

As stated, the containers roll on around the track drawing the label from under the curling bar 194 and then roll past a sponge rubber seaming pad 280 which draws the label tight about the container and firmly affixes the lap seam. From the seaming pad, the containers move onto the discharge turntable disc 65 and thence back onto the conveyor 62.

Label feed mechanism

The positive label feed for the label holding and guiding magazine already described herein is disclosed in FIGURES 23 to 28 inclusive of the drawings. The labels are directly fed toward the containers by a label feed arm 186 which includes rack teeth 300 along its left side surface and is provided with a label-engaging press foot 302 at its inner end, the angle of which may be adjusted by the mounting screws 304.

The label feed mechanism 299 is enclosed in a housing 306 mounted on the labeling machine cabinet top 56 adjacent and radially outward of the label guiding and holding magazine toward and from which the label feed arm 186 is slidably movable in confining guides 301 through the housing 306. A label press drive shaft 308 is vertically disposed and rotatably mounted in suitable bearings in the housing adjacent the feed arm and is provided with a pinion 310 which meshes with the rack teeth 300′

A label feed release lever 312 having an upstanding hub 314 bearing against the bottom of the pinion 310, an angled end portion 316 resting against the side plate 318 of the housing 306, a slightly arcuate release arm portion 320 and an operating lever 322 having a handle 192 extending through the housing is rotatably mounted on the label press drive shaft 308 just above the ratchet wheel 184 which is keyed thereto. The handle 192 is movable against the action of a spring 326 to a stop 328 from the position shown toward the feed arm 186 to retract it.

The rocker arm 180 is rotatably journalled on the shaft 308 below the ratchet wheel 184 and includes upstanding studs 330, 332 adjacent its ends, the former comprising an eccentric shaft mounting the ratchet wheel engaging pawls 182, and the latter comprising a cam actuator which stud extends below the rocker arm and has a cam follower 334 fixed thereto. A block 336 is mounted on the table top 56 and pivotally supports a pair of pawls 338 which are urged into engagement with the ratchet wheel 184 by springs 340 while springs 342 so urge the pawls 182. The drive shaft 94 which is driven by the motor M includes on the upper end thereof a label feed cam 344 against which the cam follower 334 bears.

When the label holding and guiding magazine is fully loaded, the labels L extend beyond the reach arm 176 (FIGURES 11 and 12). As the labels are depleted by being adhesively picked up by successive containers, the reach arm is gradually exposed to thus allow a container to come in contact therewith. When this occurs after a dozen or more labels are removed from the stack, the reach arm cam surface 179 engages the cam actuator 332 swinging the rocker arm 180 so that the cam follower is engaged by the constantly rotating cam 344 to further move the rocker arm 180 to engage the pawls 182 and 338 into the teeth of the ratchet wheel 184 to index it and move the label feed arm 186 and its press foot 302 inwardly to feed a compensating number of labels to the original predetermined height (radial thickness of the stack).

As the label feed arm 186 thus moves in during the operation of the labeling machine, the label stack is depleted and finally, the two label stops 190 located on the upper label guide plate 156, drop down. It is at this point that the label magazine should be reloaded. The label stops 190, as earlier stated, prevent the label stack from falling backwards thus allowing a few seconds of time to retract the label feed arm 186 and reload the magazine without shutting off the machine 40.

The label holding and guiding magazine is reloaded by moving the label feed release lever 322 by its ball handle 192 toward the label feed arm 186 against the action of the tension spring 326 which automatically retracts the label feed arm. A new stack of labels is inserted on its side in the magazine with the printed side toward the operator, and the label feed arm 186 and its press foot 302 is cranked to its forward position engaging the stack by a hand wheel 350 keyed to the upper end of the label press drive shaft 308.

It will now be appreciated that the various cooperating mechanisms comprising the present improved vertical rotary labeling machine 40 are simple and practical in construction while being precision engineered for a minimum of initial cost and maintenance while cooperating to label containers of all types and sizes with great efficiency at unusually high speeds.

It is to be understood that the forms of the invention herewith shown and described are to be taken as preferred examples of the same and that various changes in the shape, size and arrangement of parts may be resorted to without departure from the spirit of the invention.

What is claimed is:

1. A labeling machine comprising, in combination, a gluing station to which vertically disposed containers to be labeled are rotatively propelled and spotted with glue; a label guiding and holding magazine station to which glue-spotted containers are rotatively propelled and caused to adhesively contact labels and strip them from said magazine and wrap them about said containers; wheel means for propelling containers successively to and past said station and without contacting their labels; and power means connected to and synchronizing the operation of said gluing station and said propelling means.

2. The combination recited in claim 1 wherein said gluing station includes glue applying roller means having scrapers for regulating the amount of glue applied to the containers.

3. The combination recited in claim 1 wherein said propelling means includes confining means engaging the top and bottom ends of the containers to prevent their tilting while being propelled.

4. The combination recited in claim 3 wherein said confining means comprise spaced, concentric rotatable means separate from and movable independently of said propelling means except when frictionally engaged through the containers.

5. In the combination recited in claim 1, a gluing station to which containers to be labeled are rotatively propelled and spotted with glue; a label guiding and holding magazine station to which glue-spotted containers are rotatively propelled and caused to adhesively contact labels and strip them from said magazine and wrap them about said containers; a pasting means station arranged transversely of and contactible with the end of a label in said magazine to apply paste to said end to adhere it completely to its other end when wrapped about a container; means for feeding labels in said magazine into position to be stripped therefrom by a glue-spotted container; and means for propelling containers successively to and past said stations without contacting their labels.

6. A labeling machine comprising, in combination, a gluing station to which containers to be labeled are rotatively propelled and spotted with glue; a label guiding and holding magazine station to which glue-spotted containers are rotatively propelled and caused to adhesively contact labels and strip them from said magazine and wrap them about said containers; a pasting means station including a pivoted pasting roller arranged transversely of, spaced therefrom and contactible with the end of a label in said magazine to apply paste to said end to adhere it completely to its other end when wrapped about a container; means for propelling containers successively to and past said stations without contacting their labels; and power means connected to and synchronizing the operation of said gluing station and said propelling means.

7. The combination recited in claim 6, and means operable by the propelled movement of the container to pivot said roller of said pasting means to apply paste to a label.

8. The combination recited in claim 7 wherein said operable means comprises a mechanism including a lever engageable by a passing container.

9. The combination recited in claim 7 wherein said operable means comprises a photo electric cell, and mechanism controlled thereby and activatable upon the breaking of the beam of said cell by a passing container.

10. An apparatus for applying paste to the lap end of a label contained in a magazine comprising, in combination, a pivoted paste applying roller spaced from and arranged transversely of and contactible with the lap end to apply paste thereto, a reservoir communicating with said roller for supplying paste thereto, and means for rotating said roller to prevent the drying out of the paste thereon.

11. The combination recited in claim 10, and means responsive to the passing by of a partially labeled container to effect movement of and to contact said pivoted roller against a label to apply paste thereto.

References Cited

UNITED STATES PATENTS

| | | | |
|---|---|---|---|
| 561,656 | 6/1896 | Cornell et al. | 156—453 |
| 2,336,839 | 12/1943 | Blackstone | 156—362 |
| 2,468,922 | 5/1949 | Cook | 156—362 XR |
| 2,495,174 | 1/1950 | McClatchie | 156—451 |
| 2,517,395 | 8/1950 | Lewis | 156—453 XR |
| 2,556,787 | 6/1951 | Bach et al. | 156—363 |
| 3,017,311 | 1/1962 | Mattingly et al. | 156—453 XR |
| 3,179,548 | 4/1965 | Debray | 156—451 XR |

EARL M. BERGERT, *Primary Examiner.*

M. E. McCAMISH, *Assistant Examiner.*

U.S. Cl. X.R.

156—451